US009803316B2

(12) United States Patent
Lauer

(10) Patent No.: US 9,803,316 B2
(45) Date of Patent: Oct. 31, 2017

(54) METHOD AND DEVICE FOR PRODUCING A ROPE

(71) Applicant: CASAR Drahtseilwerk Saar GmbH, Kirkel (DE)

(72) Inventor: Bruno Lauer, Marpingen (DE)

(73) Assignee: CASAR DRAHTSEILWERK SAAR GMBH, Kirkel (DE)

( * ) Notice: Subject to any disclaimer, the term of this patent is extended or adjusted under 35 U.S.C. 154(b) by 418 days.

(21) Appl. No.: 14/408,715

(22) PCT Filed: Jun. 12, 2013

(86) PCT No.: PCT/DE2013/100213
§ 371 (c)(1),
(2) Date: Dec. 17, 2014

(87) PCT Pub. No.: WO2013/189485
PCT Pub. Date: Dec. 27, 2013

(65) Prior Publication Data

US 2015/0191871 A1 Jul. 9, 2015

(30) Foreign Application Priority Data

Jun. 18, 2012 (DE) ........................ 10 2012 105 261

(51) Int. Cl.
*D07B 5/00* (2006.01)
*D07B 1/14* (2006.01)
(Continued)

(52) U.S. Cl.
CPC ............... *D07B 1/148* (2013.01); *D07B 5/00* (2013.01); *D07B 7/02* (2013.01); *G09F 3/00* (2013.01)

(58) Field of Classification Search
CPC ................ D07B 5/00; D07B 7/02; G09F 3/00
(Continued)

(56) References Cited

U.S. PATENT DOCUMENTS 951,147 A * 3/1910 Porter .................... H01B 7/365
101/DIG. 39
1,216,964 A * 2/1917 Dodge .................... G09F 3/205
40/316
(Continued)

FOREIGN PATENT DOCUMENTS

DE 2636110 A1 3/1977
DE 7823387 U1 11/1978
(Continued)

*Primary Examiner* — Shaun R Hurley
*Assistant Examiner* — Bao-Thieu L Nguyen
(74) *Attorney, Agent, or Firm* — Lucas & Mercanti, LLP; Klaus P. Stoffel

(57) ABSTRACT

A method and device for producing a rope, in particular a wire rope, a fiber rope or a rope having wire and fibers, wherein the rope is provided with a marking during the stranding thereof. The marking is changed during the stranding operation. Expediently, during stranding, the marking is provided successively with details characterizing the stranding progress. The details include production parameters, for example information relating to the length of the rope already formed, about raw materials used, the stranding speed and/or the current stranding time. The details are provided on a wire, a wire strand and/or a marking strand, wherein the details are printed on the wire, the wire strand or the marking strand or are embossed in the wire, the wire strand or the marking strand, and/or chips, preferably radio chips, are arranged in the rope.

20 Claims, 3 Drawing Sheets

(51) Int. Cl.
*D07B 7/02* (2006.01)
*G09F 3/00* (2006.01)

(58) Field of Classification Search
USPC .............................................................. 57/244
See application file for complete search history.

(56) References Cited

U.S. PATENT DOCUMENTS 1,274,401 A * 8/1918 Everett .................... G09F 3/205 283/117
1,282,390 A * 10/1918 Dodge .................... G09F 3/205 40/316
1,635,739 A * 7/1927 Brewster ................ D07B 1/148 124/90
1,635,750 A * 7/1927 Jenks ..................... D07B 1/148 174/112
1,721,564 A 9/1928 Lawson
1,738,316 A * 12/1929 Reber .................... D07B 1/148 40/316
1,970,376 A * 8/1934 Hamburger ............ A63B 51/02 124/90
2,031,267 A * 2/1936 Koon ....................... D07B 1/14 57/211
2,687,673 A * 8/1954 Boone .................. G02B 5/3025 118/33
3,050,824 A * 8/1962 Lemelson ................. D01F 1/10 139/420 R
3,197,554 A * 7/1965 Baker .................... H01B 7/365 139/425 R
3,664,108 A * 5/1972 Strelow .............. H01B 13/0242 57/294
4,275,768 A * 6/1981 Riggs .................... F16L 11/124 138/104
4,498,282 A * 2/1985 Graetz ................... D07B 1/148 116/200
4,876,818 A * 10/1989 Fralick ................. A01K 11/006 28/166
5,362,326 A * 11/1994 Hasui ..................... D07B 7/145 118/308
5,703,983 A * 12/1997 Beasley, Jr. ............ G02B 6/449 385/103
5,729,966 A * 3/1998 Grulick .................. G02B 6/449 385/147
5,745,628 A * 4/1998 Benzel ................. G02B 6/4482 156/64
5,809,194 A * 9/1998 Lovie ................... G02B 6/4407 347/4
5,904,037 A * 5/1999 Grulick .................. G02B 6/449 174/112
6,050,077 A 4/2000 Muller
6,247,359 B1 * 6/2001 De Angelis .............. D07B 1/14 73/158
6,250,254 B1 * 6/2001 Weinacker ........... A01K 15/026 119/707
6,314,713 B1 * 11/2001 Fitz ........................ G02B 6/449 385/147
6,370,304 B1 * 4/2002 Mills .................... G02B 6/4482 385/114
6,839,994 B2 * 1/2005 Proctor ................... G09F 3/005 124/90
7,093,417 B1 * 8/2006 MacZura ................. D07B 5/00 57/235
7,360,477 B2 * 4/2008 Hess ...................... D07B 1/025 57/210
7,441,464 B2 * 10/2008 Turnbull ................ D07B 1/145 73/146
7,461,500 B2 * 12/2008 Theis ..................... D07B 1/145 57/238
8,176,718 B2 5/2012 Ridge et al.
8,316,629 B2 * 11/2012 Huang ..................... D02G 3/06 57/243
8,342,584 B1 * 1/2013 Carmichael ............... B66C 1/12 294/74
8,347,533 B2 * 1/2013 Hardin ...................... B65C 3/02 40/316
8,912,889 B2 * 12/2014 Sarchi ..................... G01L 5/047 340/10.1
9,070,308 B2 * 6/2015 Hardin ...................... B65C 3/02
2008/0136551 A1 * 6/2008 Phillips .................. B82Y 10/00 333/32
2011/0089130 A1 4/2011 Stephan
2015/0197408 A1 * 7/2015 St. Germain .......... B65H 63/02 340/668

FOREIGN PATENT DOCUMENTS

| | | | |
|---|---|---|---|
| DE | 202006013114 | U1 | 12/2006 |
| DE | 202009014031 | U1 | 12/2009 |
| EP | 0082432 | A1 | 6/1983 |
| EP | 2592033 | A1 | 5/2013 |
| FR | 2322968 | A1 | 4/1977 |
| FR | 2402736 | A1 | 4/1979 |
| WO | 03027383 | A1 | 4/2003 |
| WO | 2008141623 | A2 | 11/2008 |
| WO | 2012004867 | A1 | 1/2012 |

* cited by examiner

METHOD AND DEVICE FOR PRODUCING A ROPE

The present application is a 371 of International application PCT/DE2013/100213, filed Jun. 12, 2013, which claims priority of DE 10 2012 105 261.1, filed Jun. 18, 2012, the priority of these applications is hereby claimed and these applications are incorporated herein by reference.

BACKGROUND OF THE INVENTION

The invention pertains to a method for producing a rope, especially a wire rope, a rope made of fibers, or a rope comprising wire and fibers, in which the rope is provided with a marking as it is being stranded. The invention also pertains to a device for carrying out the method and to the rope provided with the marking.

It is known through prior use that a marker thread can be incorporated into the rope as it is being stranded; on the basis of this thread, the maker of the rope and the production lot to which the rope belongs can be determined.

Because rope is often produced in lots of considerable size, e.g., in lengths of more than 2,000 m, from which several sections are then cut to obtain individual ropes for delivery to various customers, there is the problem that it is no longer possible, at a later date, to determine the section of the associated lot from which the rope originated.

SUMMARY OF THE INVENTION

The invention is based on the goal of making it possible to assign individual sections of rope more accurately to their production conditions.

According to the invention, this goal is achieved in that the marking is changed during the course of stranding. On the basis of the markings, which change as they proceed along the length of the rope, individual locations on the rope produced by means of the method or individual sections of it are identified and can thus be differentiated from each other. A length of rope can thus be assigned to a specific section of the production lot. If the production conditions, e.g., the raw materials used, the stranding speed, the time/date of stranding, the length of rope already produced, or the like, as well as the associated marking provided on the rope, are logged during the stranding process, it is possible to assign the data on the production conditions to the locations or sections of the rope.

The marking advisably comprises codes, on the basis of which the marking can be linked with the associated information. The marking can be formed by a color code, an optically readable code, e.g., a sequence or letters or numbers, a barcode, or the like, or possibly by data which can be read from a chip.

Alternatively or supplementally, it would also be conceivable to provide the marking, as the rope is being stranded, h a succession of codes characterizing the course of the stranding process. A complete set of codes, which advisably also comprises one or more of the items of information about the production conditions, can then be read out from the marking.

The codes are advisably provided on the rope equal distances apart; for example, they can be provided once per meter of rope produced.

In one embodiment of the invention, the code is provided on a wire, a stranded wire, and/or a marking strand to be incorporated into the rope. Whereas it would be possible to apply the code by embossing it, it is preferable, in a preferred embodiment, to apply the code to the wire, to the stranded wire, or to the marking strand by means of ink-jet printing. In a further elaboration of the invention, the previously mentioned chips are arranged in the rope. Radio chips, preferably RFID chips, are advisably used. Whereas it would be possible to attach the chips directly, during stranding, to a part of the cable made of plastic or to incorporate them into such a plastic part, such as into the plastic sheath around the cable or into an intermediate rope layer of plastic as known from WO 2008 141 623, they are, in an especially preferred embodiment of the invention, arranged on the marking strand.

The wire, stranded wire, or marking strand provided with the code advisably passes in a straight line through the rope. In this case, the code can be correlated especially easily with the length of the rope. In the preferred embodiment of the invention, the marking strand is arranged directly adjacent to a core rope extending in a straight line through the rope. It is also possible, however, for the wire, the stranded wire, or the marking strand on which the code is provided to be wound around the rope together with the outer strands. Nevertheless, in that case, especially when the code pertains to the length of rope produced up to that point, it will be necessary to take into account the helical form of the wire, of the stranded wire, or of the marking strand in the rope.

In another embodiment of the invention, the marking strand is arranged on or inside a plastic layer of the rope. It is advantageous in this case that the marking strand is thus also protected from the damage which might be caused by mechanical loads on the rope.

In one embodiment of the invention, the wire, the stranded wire, or the marking strand is provided with the code before the stranding process even begins; in this case, it is coiled up first in preparation for the stranding process. During the stranding process, the wire, the stranded wire, or the marking strand is then unwound, guided to the stranding site, and incorporated into the rope. Alternatively, the wire, the stranded wire, or the marking strand can be provided with the marking during the stranding process and then guided directly to the stranding site. In this variant, it is possible to include in the code the manufacturing conditions such as the time/date of the stranding or the stranding speed on a continually updated basis.

A device comprising a unit for stranding the rope and a unit for applying the marking to the rope is provided to produce the rope. The unit for stranding the rope is advisably formed by a stranding machine known from the prior art. In the preferred embodiment, the marking unit comprises an embossing or printing device, by means of which the wire, the stranded wire, or the marking strand can be provided with the code, or a data transmission device, by means of which the data can be stored on the previously mentioned chips.

The marking unit is preferably provided to provide the rope with a succession of codes during the stranding process, which codes characterize the course of the stranding. For this purpose, the marking unit preferably comprises a device for compiling the codes to be applied. This device is connected to a logging device of the stranding machine, which receives and records the previously mentioned production parameters and the associated marking provided on the cable correlated with those parameters.

The invention is explained in greater detail below on the basis of exemplary embodiments and the attached drawings, which pertain to these exemplary embodiments:

DETAILED DESCRIPTION OF THE INVENTION

Figure 1:
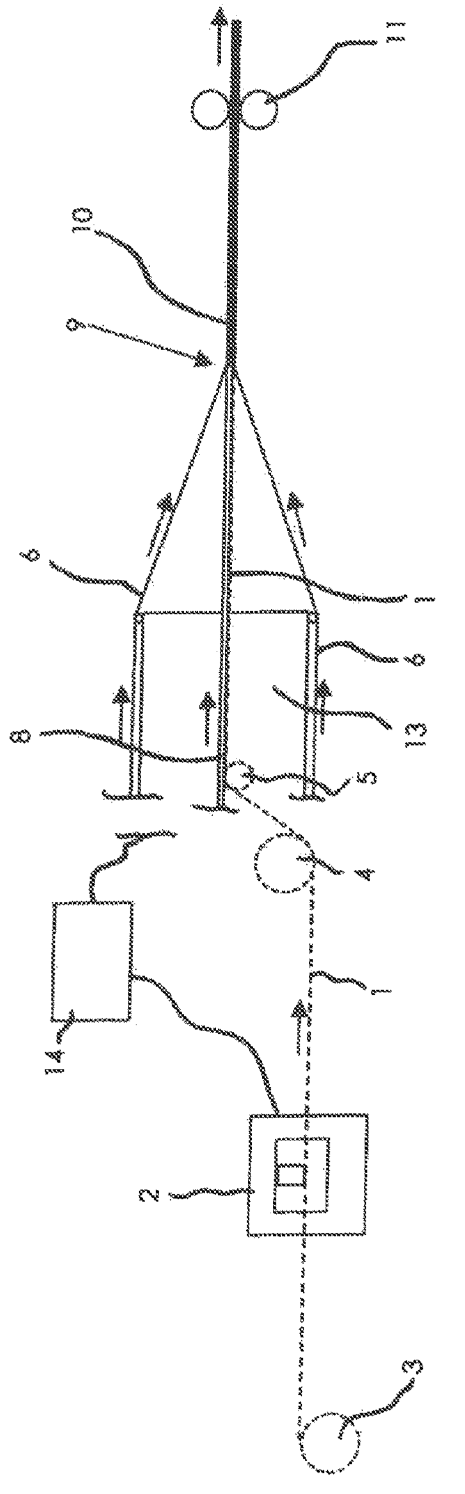
FIG. 1 shows a schematic diagram of a device according to the invention.

The device illustrated schematically in FIG. 1 for producing a wire rope, a fiber rope, or a hybrid rope consisting of fibers and wires comprises a marking unit 2, by means of which changing codes are applied successively to a plastic marking strand 1 by means of ink-jet printing. For this purpose, the marking strand 1 is unwound from a drum 3, drawn through the marking unit 2, and sent by way of deflecting pulleys 4 and 5 to a core stranded wire 8, which forms the core stranded wire 8 of the rope 10 to be produced.

The marking strand 1 is guided through a stranding basket 13 to a stranding point in parallel with the core stranded wire 8. By way of the stranding basket 9, which rotates around its longitudinal axis, outer stranded wires 6 are wound around the core stranded wire 8 at the stranding point 9 to form the rope 10, which is pulled away from the stranding point 9 by drawing pulleys 11. The marking strand 1 is arranged to pass in a straight line through the rope 10 during the stranding process.

Figure 3:
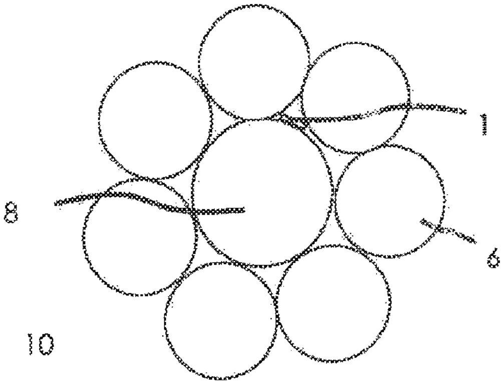
FIG. 3 shows a cross section through a rope according to the invention.
Figure 5:
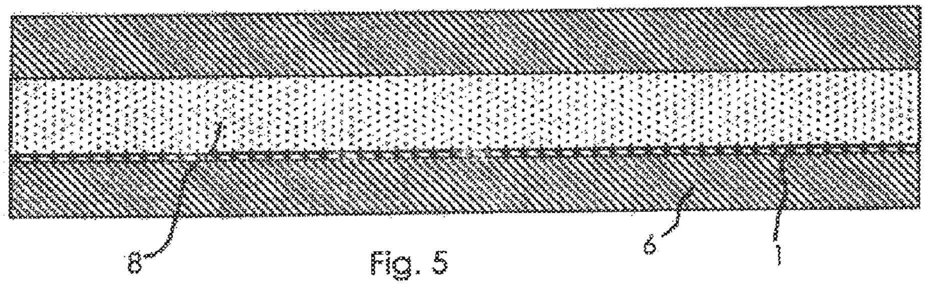
FIG. 5 shows a schematic longitudinal cross section of the rope according to the invention of FIG. 3.

FIG. 3 shows a transverse cross section and FIG. 5 a longitudinal cross section through the rope 10. As can be derived from the figures, the marking strand 1 is arranged in the rope 10 parallel to the core stranded wire 8.

The marking unit 2 is connected to a device 14 for logging the production conditions during the stranding of the rope 10; the unit records the parameters of the stranding process and, in correlation with them, the associated marking applied to the rope. The parameters comprise the length of rope 10 already produced, the date/time of stranding, data on the outer stranded wires 6 and the core stranded wires 8 used to produce the rope 10, possibly data on the plastic used in the production of the rope 10, the temperatures during production, especially the temperatures for softening the plastic, and the stranding speed.

Figure 6:
FIG. 6 shows the section of a marking strand according to the invention.
Figure 7:
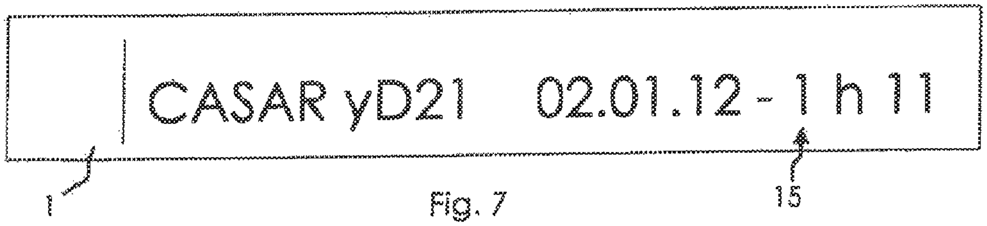
FIG. 7 shows a section of another marking strand according to the invention.

If, as shown in FIG. 6, a code for the manufacturer, the lot, and the length of rope produced up to that point is printed on the marking strand, it is possible to link the recorded data on the production conditions with the associated position on the rope 10. The same is true if, in addition to the manufacturer and lot data, the date/time of the stranding is applied to the marking strand 1 (FIG. 7). In addition, the changing codes can also be formed by a color marking, by a barcode, or a by 2D code. If, during the use of the rope 10, a defect is later detected in the rope, it is possible on the basis of the codes on the marking strand 1 to determine in which lot and under what production conditions the rope 10 was produced; this is done by correlating the associated location on the rope with the data stored in the logging unit 14. It is obvious that all of the data pertaining to the production conditions can be applied to the marking strand.

Figure 4:
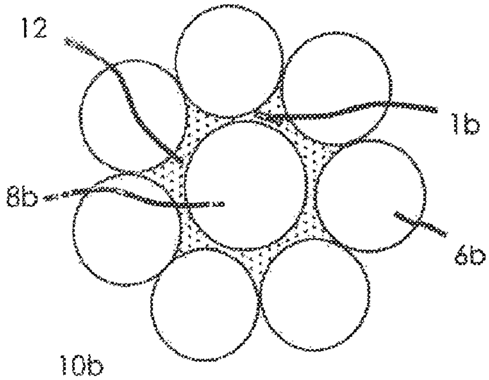
FIG. 4 shows a cross section through another rope according to the invention.

Another rope 10*b* according to the invention as shown in FIG. 4 differs from that according to FIGS. 3 and 5 in that, between a core stranded wire 8*b* and the outer stranded wires 6*b*, a plastic layer 12 is provided, in which a marking strand 1*b* is embedded. For the production of the rope 10*b*, the marking strand 1*b*, together with the core stranded wire 8*b*, is coated with the plastic by a coating unit and thus embedded in the plastic.

Figure 8:
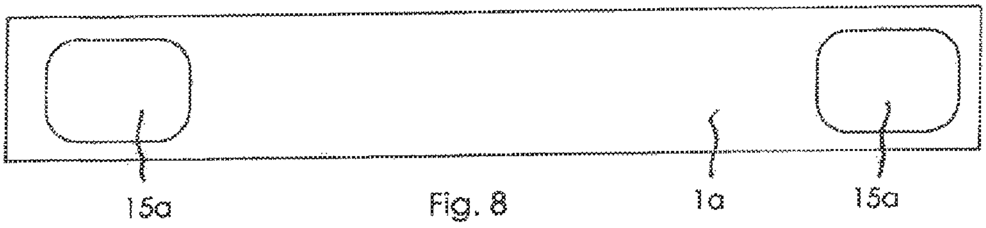
FIG. 8 shows a section of another marking strand according to the invention.

In the exemplary embodiment shown in FIG. 8, RFID chips 15*a* are provided in a marking strand 1*a*. These chips are advisably configured and embedded in the marking strand 1*a* in such a way that they are able to withstand the mechanical loads to which the wire rope is subjected. For this purpose, they can be made so that they are flexible and can be embedded in a layer resistant to mechanical loads. The marking unit 2*a* is provided for this purpose in such a way that it can store some or all of the data on the production conditions on each RFID chip 15*a*. It is advantageous for the data on the RFID chips 15*a* to be read out without the need to separate the marking strand from its associated rope.

Figure 2:
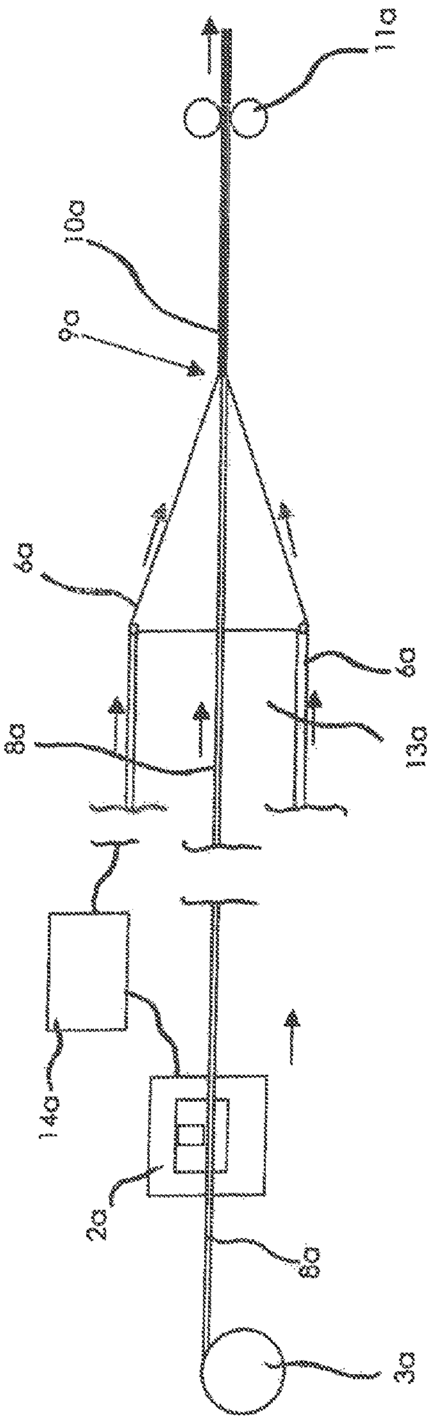
FIG. 2 shows another device according to the invention.

The additional device according to the invention as shown in FIG. 2 differs from that according to FIG. 1 in that the markings are not provided on a separate marking strand 1 but rather are printed directly on a core stranded wire 8*a* of the rope 10*a* to be produced. For this purpose, the core stranded wire 8*a*, which can be made of fibers and/or of wire, is fed through a stranding basket 13*a*, so that it can then be stranded with outer stranded wires 6*a* to form the rope 10*a*. As also described for the exemplary embodiment according to FIG. 1, data are transmitted by a logging device 14*a* to the marking unit 2*a*, which data are applied to the core stranded wire 8*a* during the stranding process. Alternatively to printing, the marking can also be embossed into the wire, provided that the core stranded wire 8*a* is made of wire.

Figure 9:
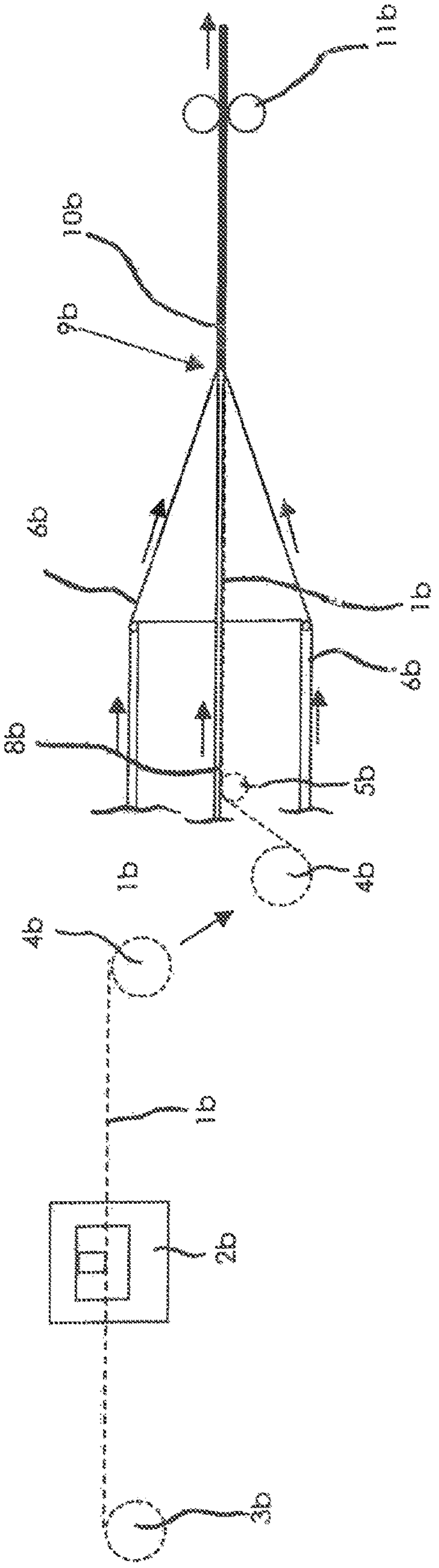
FIG. 9 shows another device according to the invention.

In the case of the additional device according to the invention shown in FIG. 9, a marking strand 1*b* is provided with a code by a marking unit 2*b* even before the stranding process. After the marking has been applied, the marking strand 1*b* is wound up onto a drum 4*b*. During stranding, the marking strand 1*b* is unwound from the drum 4*b* and, as already explained above for the exemplary embodiment according to FIG. 1, guided parallel to a core stranded wire 8*b* to a stranding site 9*b* and there stranded with the outer stranded wires 6*b* to form the rope 10*b*. During the stranding process, the previously mentioned production parameters and the codes additionally applied to the cable 10*b* are recorded, so that individual locations on the rope 10*b* can be linked with the associated manufacturing conditions.

The invention claimed is:

1. A method for producing a rope, comprising the steps of: stranding the rope; providing the rope with a marking as the rope is being stranded; changing the marking during the stranding process; providing the marking with a succession of codes characterizing progress of the stranding; and providing the codes on at least one of a wire, a wire strand, a fiber strand, and a marking strand, wherein the wire, the wire strand, the fiber strand, or the marking strand passes in a straight line through the rope and is next to a core rope passing in a straight line through the rope.

2. The method according to claim 1, wherein the codes comprise production parameters including data on a length of rope already produced, raw materials used, stranding speed, and/or current stranding date/time.

3. The method according to claim 1, including printing the codes on the wire, wire strand, fiber strand, and/or marking strand.

4. The method according to claim 1, including embossing the codes into the wire, wire strand, or marking strand.

5. The method according to claim 1, including arranging chips in the rope.

6. The method according to claim 5, wherein the chips are radio chips.

7. A method for producing a rope, comprising the steps of: stranding the rope; providing the rope with a marking as the rope is being stranded; changing the marking during the stranding process; providing the marking with a succession of codes characterizing progress of the stranding; and providing the codes on at least one of a wire, a wire strand, a fiber strand, and a marking strand, wherein the wire, the wire strand, the fiber strand, and/or the marking strand is provided with the marking prior to stranding, is wound up, and is then unwound during the stranding and guided to a stranding port.

8. The method according to claim 7, wherein the codes comprise production parameters including data on a length of rope already produced, raw materials used, stranding speed, and/or current stranding date/time.

9. The method according to claim 7, including printing the codes on the wire, wire strand, fiber strand, and/or marking strand.

10. The method according to claim 7, including embossing the codes into the wire, wire strand, or marking strand.

11. The method according to claim 7, including arranging chips in the rope.

12. The method according to claim 11, wherein the chips are radio chips.

13. The method according to claim 7, wherein the wire, the wire strand, the fiber strand, or the marking strand passes in a straight line through the rope.

14. A method for producing a rope, comprising the steps of: stranding the rope; providing the rope with a marking as the rope is being stranded; changing the marking during the stranding process; providing the marking with a succession of codes characterizing progress of the stranding; and providing the codes on at least one of a wire, a wire strand, a fiber strand, and a marking strand, wherein the wire, the wire strand, or the marking strand is provided with the marking during stranding and is guided to a stranding point.

15. The method according to claim 14, wherein the codes comprise production parameters including data on a length of rope already produced, raw materials used, stranding speed, and/or current stranding date/time.

16. The method according to claim 14, including printing the codes on the wire, wire strand, fiber strand, and/or marking strand.

17. The method according to claim 14, including embossing the codes into the wire, wire strand, or marking strand.

18. The method according to claim 14, including arranging chips in the rope.

19. The method according to claim 18, wherein the chips are radio chips.

20. The method according to claim 14, wherein the wire, the wire strand, the fiber strand, or the marking strand passes in a straight line through the rope.

* * * * *